UNITED STATES PATENT OFFICE.

LUDWIG KNORR, OF ERLANGEN, ASSIGNOR TO FARBWERKE, VORMALS MEISTER, LUCIUS & BRÜNING, OF HÖCHST-ON-THE-MAIN, GERMANY.

PREPARATION OF DIMETHYL-PHENYL-OXYPYRAZOL.

SPECIFICATION forming part of Letters Patent No. 307,399, dated October 28, 1884.

Application filed March 5, 1884. (Specimens.) Patented in Germany July 22, 1883, No. 26,429.

*To all whom it may concern:*

Be it known that I, LUDWIG KNORR, a citizen of the Empire of Germany, and a resident of Erlangen, in the Empire of Germany, have invented certain new and useful Improvements in the Preparation of Dimethyl-phenyl-oxypyrazol; and I do hereby declare that the following is a full, clear, and exact description thereof, which will enable others skilled in the art to which it appertains to make and use the same.

My invention consists of a new product, dimethyl-phenyl-oxypyrazol, from phenyl-hydrazine, the latter yielding, as products of a series of operations, new compounds, which I have found to be valuable medicaments.

The following is a description of my method of proceeding.

By mixing the body well known as acetylacetic ether with a molecular quantity of phenyl-hydrazine, water is eliminated, and a condensation product is formed, termed "phenyl-hydrazine-acetylacetic ether," of the formula:

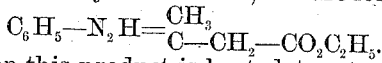

When this product is heated to a temperature of 100° to 150° centigrade, until a sample perfectly solidifies on cooling or on immersion into ether, a mass will result which, after crystallization from water or from some other medium, represents pure methyl-phenyl-oxypyrazol. Its formation from phenyl-hydrazine-acetylacetic ether takes place under production of alcohol, as expressed in the equation:

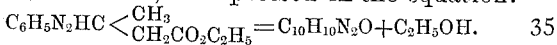

When the methyl-phenyl-oxypyrazol thus formed is heated with methyl chloride, bromide, or iodide, it is readily converted into dimethyl-phenyl-oxypyrazol.

Dimethyl-phenyl-oxypyrazol is distinguished by the following properties: It crystallizes from ether in lamellæ of a pearly luster, melting at 113° centigrade. It is soluble in alcohol, water, and acids, from which solutions it is precipitated by concentrated alkalies. Its aqueous solution turns red on addition of ferric chloride, and green when a nitrite is added. When a concentrated aqueous solution is mixed with the solution of a nitrite, green crystals separate on standing.

What I claim as new, and desire to secure by Letters Patent, is—

The new product dimethyl-phenyl-oxypyrazol, the result of the process herein described, the same being distinguished by the properties herein mentioned.

In testimony that I claim the foregoing as my own I affix my signature in presence of two witnesses.

LUDWIG KNORR.

Witnesses:
A. S. HOGUE,
J. GRUND.